United States Patent
Ishizuka

(10) Patent No.: US 10,087,271 B2
(45) Date of Patent: Oct. 2, 2018

(54) POLYMER, POLYMER DISPERSION, AND AQUEOUS INK

(71) Applicant: FUJI XEROX CO., LTD., Tokyo (JP)

(72) Inventor: Takahiro Ishizuka, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/582,884

(22) Filed: May 1, 2017

(65) Prior Publication Data
US 2018/0057627 A1  Mar. 1, 2018

(30) Foreign Application Priority Data
Aug. 26, 2016  (JP) .................. 2016-166225

(51) Int. Cl.
| | | |
|---|---|---|
| C08F 220/30 | (2006.01) | |
| C08F 220/18 | (2006.01) | |
| C09D 11/107 | (2014.01) | |
| C08F 220/14 | (2006.01) | |
| C09D 133/12 | (2006.01) | |

(52) U.S. Cl.
CPC .......... *C08F 220/14* (2013.01); *C09D 11/107* (2013.01); *C09D 133/12* (2013.01)

(58) Field of Classification Search
None
See application file for complete search history.

(56) References Cited

U.S. PATENT DOCUMENTS

| | | | |
|---|---|---|---|
| 2002/0025994 A1* | 2/2002 | Ishizuka | C09D 11/30 523/160 |
| 2005/0004261 A1 | 1/2005 | Yatake | |
| 2008/0146729 A1 | 6/2008 | Yatake | |
| 2009/0041932 A1* | 2/2009 | Ishizuka | C09D 11/30 427/152 |
| 2009/0163646 A1 | 6/2009 | Kato et al. | |
| 2009/0170989 A1* | 7/2009 | Steele | C08L 33/06 524/190 |
| 2009/0176443 A1* | 7/2009 | Kollodge | B24B 37/245 451/28 |
| 2011/0166273 A1 | 7/2011 | Yatake | |
| 2015/0307723 A1* | 10/2015 | Breton | C09D 11/322 523/322 |
| 2015/0361285 A1* | 12/2015 | Breton | C09D 11/38 347/20 |

FOREIGN PATENT DOCUMENTS

| | | |
|---|---|---|
| JP | 2005-23284 A | 1/2005 |
| JP | 2005-272790 A | 10/2005 |
| JP | 2009-173867 A | 8/2009 |

OTHER PUBLICATIONS

Glass-Transition Temperature of Homopolymer of 2-Carboxyethyl Acrylate, from bimax.com, downloaded Jan. 20, 2018.*
Glass-Transition Temperatures of Common Polymers, from Sigma-Aldrich.*
Glass-Transition Temperature of Common Polymers, from Sigma-Aldrich. (Year: 2018).*

* cited by examiner

*Primary Examiner* — Vu A Nguyen
(74) *Attorney, Agent, or Firm* — Sughrue Mion, PLLC

(57) ABSTRACT

A polymer includes 2-carboxyethyl (meth)acrylate and alkyl (meth)acrylate as constituent units and having an acid value of 7 mg KOH/g to 100 mg KOH/g.

19 Claims, 1 Drawing Sheet

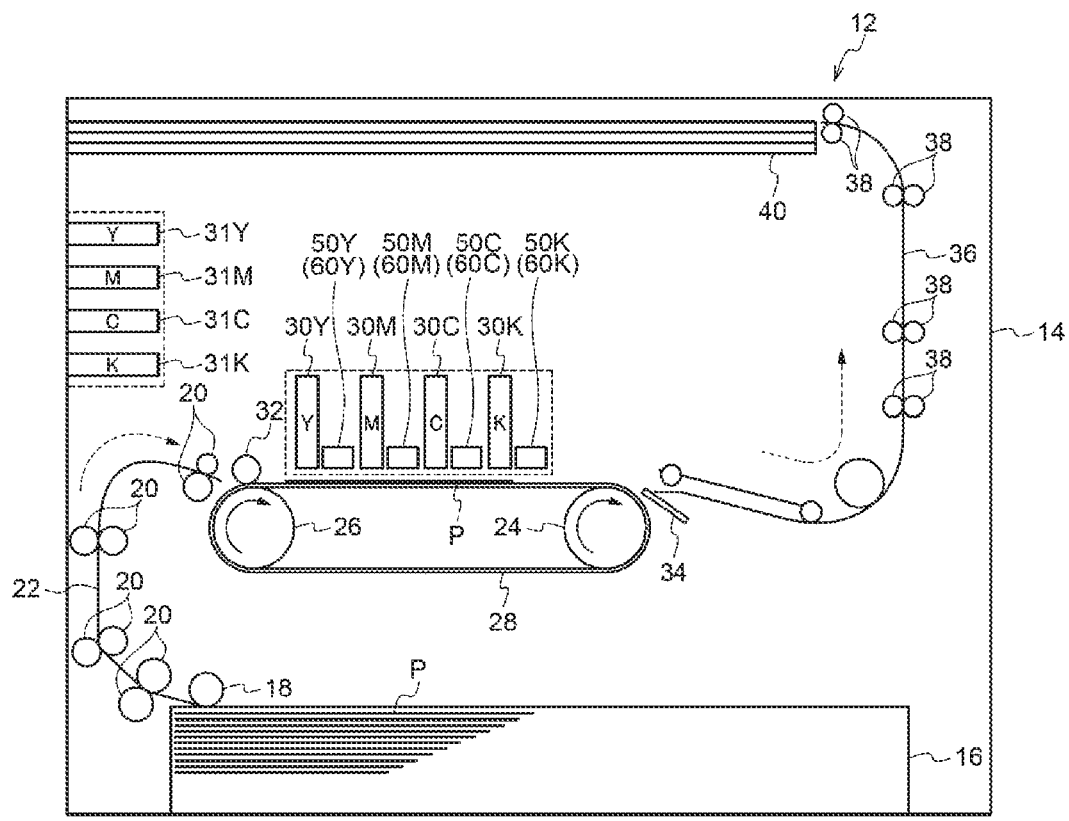

ical Field

POLYMER, POLYMER DISPERSION, AND AQUEOUS INK

CROSS-REFERENCE TO RELATED APPLICATIONS

This application is based on and claims priority under 35 USC 119 from Japanese Patent Application No. 2016-166225 filed Aug. 26, 2016.

BACKGROUND

Technical Field

The present invention relates to a polymer, a polymer dispersion, and an aqueous ink.

SUMMARY

According to an aspect of the invention, there is provided a polymer including 2-carboxyethyl (meth)acrylate and alkyl (meth)acrylate as constituent units and having an acid value of 7 mg KOH/g to 100 mg KOH/g.

BRIEF DESCRIPTION OF THE DRAWINGS

Exemplary embodiments of the present invention will be described in detail based on the following figures, wherein:

FIG. 1 is a schematic configuration diagram which shows an example of an image forming apparatus according to the exemplary embodiment.

DETAILED DESCRIPTION

Description will be given below of embodiments of the invention. These descriptions and examples are illustrative of embodiments and do not limit the scope of the invention.

In the present disclosure, in a case of referring to the amount of each component in the composition, unless otherwise specified, the amount means the total amount of plural types of substances in a case where there are such plural types of substances corresponding to each component in the composition.

In the present disclosure, "alkane", "alkyl", "alkylene", "alkene", and "alkenyl" include not only chain hydrocarbons but also cyclic hydrocarbons.

In the present disclosure, "(meth)acrylic" may mean either "acrylic" or "methacrylic".

<Polymer and Polymer Dispersion>

The polymer according to the exemplary embodiment includes 2-carboxyethyl (meth)acrylate and alkyl (meth)acrylate as constituent units and has an acid value of from 7 mg KOH/g to 100 mg KOH/g. In the present disclosure, the polymer is represented with the monomers which form a polymer described as "constituent units".

The polymer dispersion according to the exemplary embodiment is a polymer dispersion which includes an aqueous medium and a polymer dispersed in the aqueous medium, in which the polymer includes 2-carboxyethyl (meth)acrylate and alkyl (meth)acrylate as constituent units and has an acid value of from 7 mg KOH/g to 100 mg KOH/g.

In the present disclosure, the term "aqueous medium" means water or a mixed solvent of water and other solvents, which means a mixed solvent containing water as a main solvent. In the present disclosure, the term "main solvent" refers to the solvent having the highest weight among all the solvents forming the mixed solvent.

The polymer according to the exemplary embodiment is stably dispersed in an aqueous medium. Therefore, with the polymer dispersion according to the exemplary embodiment, aggregates are less likely to be generated in the process of preparing the polymer dispersion, and the yield of the polymer dispersion is high. In addition, according to the exemplary embodiment, a polymer dispersion is obtained in which polymer particles having a small particle size (for example, a volume average particle size of 150 nm or less) are dispersed.

Below, in the present disclosure, the polymer including 2-carboxyethyl (meth)acrylate and alkyl (meth)acrylate as constituent units and with an acid value of from 7 mg KOH/g to 100 mg KOH/g is referred to as a "specific polymer".

The specific polymer includes 2-carboxyethyl (meth) acrylate as a constituent unit. A polymer which includes 2-carboxyethyl (meth)acrylate as a constituent unit stably disperses in comparison with a polymer which includes (meth)acrylic acid as a constituent unit instead of 2-carboxyethyl (meth)acrylate. Moreover, the polymer which includes 2-carboxyethyl (meth)acrylate as a constituent unit stably disperses in an aqueous medium in the vicinity of neutral pH (for example, pH 6.0 to 9.5). The reason is considered to be because the carboxy group of the 2-carboxyethyl (meth) acrylate has a smaller dissociation constant pKa in comparison with the carboxy group of the (meth)acrylic acid.

The specific polymer has an acid value of from 7 mg KOH/g to 100 mg KOH/g. When the acid value of the polymer which includes 2-carboxyethyl (meth)acrylate and alkyl (meth)acrylate as constituent units is less than 7 mg KOH/g, the dispersibility of the polymer in an aqueous medium is relatively low. On the other hand, when the acid value of the polymer which includes 2-carboxyethyl (meth) acrylate and alkyl (meth)acrylate as constituent units exceeds 100 mg KOH/g, the water solubility of the polymer is relatively high. From these viewpoints, the lower limit of the acid value of the specific polymer is 7 mg KOH/g or more, preferably 8 mg KOH/g or more, and more preferably 10 mg KOH/g or more, while the upper limit is 100 mg KOH/g or less, preferably 80 mg KOH/g or less, and more preferably 60 mg KOH/g or less.

The specific polymer may be a polymer dispersed in a liquid state in an aqueous medium or may be a polymer dispersed in a solid state in an aqueous medium and, from the viewpoint of dispersion stability, a polymer dispersed in a solid state in an aqueous medium is preferable.

That is, the polymer dispersion according to the exemplary embodiment may be an emulsion in which a specific polymer is dispersed in an aqueous medium in a liquid state, or a suspension in which a specific polymer is dispersed in an aqueous medium in a solid state and, from the viewpoint of the dispersion stability of the specific polymer, a suspension is preferable.

Detailed description will be given below of the components, composition, preparation methods, and the like of the specific polymer and polymer dispersion.

[Specific Polymer]

The specific polymer includes at least 2-carboxyethyl (meth)acrylate and alkyl (meth)acrylate as constituent units and has an acid value of from 7 mg KOH/g to 100 mg KOH/g. The lower limit of the acid value of the specific polymer is more preferably 8 mg KOH/g or more, and more preferably 10 mg KOH/g or more, while the upper limit is preferably 80 mg KOH/g or less, and more preferably 60 mg KOH/g or less.

In the exemplary embodiment, the acid value of the polymer is a value determined by a neutralization titration method defined in JIS K 0070: 1992.

The specific polymer is obtained by polymerizing at least 2-carboxyethyl (meth)acrylate and alkyl (meth)acrylate. The specific polymer may include a monomer other than 2-carboxyethyl (meth)acrylate and alkyl (meth)acrylate as constituent units. The polymerization method of the specific polymer is not particularly limited, and the monomer mixture may be copolymerized by a known polymerization method.

From the viewpoint of excellent dispersibility in an aqueous medium, the number of carbon atoms of the alkyl group in the alkyl (meth)acrylate is preferably an alkyl group having 1 to 8 carbon atoms, more preferably an alkyl group having 1 to 4 carbon atoms, and, here, the alkyl group preferably has no substituent.

Examples of the alkyl (meth)acrylate having an alkyl group having 1 to 4 carbon atoms include methyl (meth) acrylate, ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth) acrylate, and the like.

Examples of the alkyl (meth)acrylate having an alkyl group having 5 to 8 carbon atoms include pentyl (meth) acrylate, hexyl (meth)acrylate, heptyl (meth)acrylate, 2-ethylhexyl (meth)acrylate, octyl (meth)acrylate, and the like.

One type of alkyl (meth)acrylate may be used, or two or more types may be used in combination.

From the viewpoint of more stably dispersing the organic functional compound, particularly the aromatic compound, the specific polymer preferably has an aromatic ring in the molecule, and preferably includes an aromatic ring-containing monomer as a constituent unit.

Examples of the aromatic ring-containing monomer include styrene monomers such as styrene, α-methylstyrene, dimethylstyrene, trimethylstyrene, ethylstyrene, isopropylstyrene, chlorostyrene, dichlorostyrene, chloromethylstyrene, bromostyrene, methoxystyrene, acetoxystyrene, methyl styrene carboxylate (methyl vinyl benzoate), styrene carboxylic acid (vinyl benzoate), α-methyl styrene carboxylic acid, styrenesulfonic acid, α-methylstyrenesulfonic acid, and vinylbenzylsulfonic acid; macromonomers having polystyrene structural units; aromatic group-containing (meth)acrylates such as phenyl (meth)acrylate, benzyl (meth)acrylate, naphthyl (meth)acrylate, 2-phenoxyethyl (meth)acrylate, and 2-hydroxy-3-phenoxypropyl (meth) acrylate; and the like. One type of aromatic ring-containing monomer may be used, or two or more types may be used in combination.

As the aromatic ring contained in the specific polymer, a benzene ring which is a monocyclic ring is preferable, and the specific polymer preferably contains a phenyl group in an amount of 3% by weight to 50% by weight with respect to the total weight of the specific polymer. When the content of the phenyl group is in the above range, the specific polymer forms particles easily in the aqueous medium and is easily dispersed, and the dispersion of the organic functional compound becomes more stable. From the above viewpoint, the lower limit of the phenyl group content of the specific polymer is more preferably 4% by weight or more, and even more preferably 5% by weight or more, while the upper limit is more preferably 45% by weight or less, and even more preferably 40% by weight or less.

Examples of monomers other than the monomers described above for forming the specific polymer include the following. One type of the following monomers may be used, or two or more types may be used in combination.
(Meth)acrylate esters Other than alkyl (meth)acrylate Specific examples thereof include furfuryl (meth)acrylate, tetrahydrofurfuryl (meth)acrylate, hydroxyethyl (meth)acrylate, hydroxypropyl (meth)acrylate, hydroxybutyl (meth)acrylate, hydroxypentyl (meth)acrylate, hydroxyhexyl (meth)acrylate, 2,2-dimethyl-3-hydroxypropyl (meth)acrylate, 2,2,2-tetrafluoroethyl (meth)acrylate, glycidyl (meth)acrylate, 2-methoxyethyl (meth)acrylate, 2-(2-methoxyethoxy) ethyl (meth)acrylate, ethoxytriethylene glycol (meth)acrylate, methoxypolyethylene glycol (molecular weight 200 to 1,000) mono (meth)acrylate, polyethylene glycol (molecular weight 200 to 1,000) mono (meth)acrylate, (meth)acryloyloxyalkanesulfonic acid (for example, (meth)acryloyloxyethanesulfonic acid, (meth)acryloyloxypropanesulfonic acid, (meth)acryloyloxybutanesulfonic acid, and the like), mono 2-(meth)acryloyloxy ethyl phosphate, and the like.
Carboxy Group-Containing Monomers Specific examples thereof include acrylic acid, methacrylic acid, itaconic acid, maleic acid, fumaric acid, citraconic acid, crotonic acid, itaconic acid monoalkyl esters (for example, monomethyl itaconate, monoethyl itaconate, monobutyl itaconate, and the like), maleic acid monoalkyl esters (for example, monomethyl maleate, monoethyl maleate, monobutyl maleate, and the like) and the like.
Vinyl Esters Specific examples thereof include vinyl acetate, vinyl propionate, vinyl butyrate, vinyl isobutyrate, vinyl caproate, vinyl chloroacetate, vinyl methoxy acetate, vinyl phenyl acetate, vinyl benzoate, vinyl salicylate, and the like.
(Meth)acrylamides Specific examples thereof include (meth)acrylamide, methyl (meth)acrylamide, ethyl (meth)acrylamide, propyl (meth)acrylamide, butyl (meth)acrylamide, cyclohexyl (meth)acrylamide, phenyl (meth)acrylamide, benzyl (meth) acrylamide, hydroxymethyl (meth)acrylamide, methoxy methyl (meth)acrylamide, butoxy methyl (meth)acrylamide, methoxyethyl (meth)acrylamide, dimethyl (meth)acrylamide, diethyl (meth) acrylamide, β-cyanoethyl (meth) acrylamide, N-(2-acetoacetoxyethyl) (meth) acrylamide, diacetone (meth)acrylamide, (meth)acrylamide alkanesulfonic acid (for example, 2-(meth)acrylamide-2-methyl ethanesulfonic acid, 2-(meth)acrylamide-2-methylpropanesulfonic acid, 2-(meth)acrylamide-2-methylbutanesulfonic acid, and the like), and the like.
Olefins Specific examples thereof include dicyclopentadiene, ethylene, propylene, 1-butene, 1-pentene, vinyl chloride, vinylidene chloride, isoprene, chloroprene, butadiene, 2,3-dimethylbutadiene, and the like.
Vinyl Ethers Specific examples thereof include methyl vinyl ether, butyl vinyl ether, hexyl vinyl ether, methoxyethyl vinyl ether, and the like.

Other than these, butyl crotonate, hexyl crotonate, dimethyl itaconate, dibutyl itaconate, dimethyl maleate, diethyl maleate, dibutyl maleate, dimethyl fumarate, diethyl fumarate, dibutyl fumarate, methyl vinyl ketone, phenyl vinyl ketone, methoxyethyl vinyl ketone, N-vinyl oxazolidone, N-vinyl pyrrolidone, vinylidene chloride, methylene malonitrile, monovinyl phosphate, and the like.

From the viewpoint of controlling, for example, the glass transition temperature of a specific polymer, solubility in an organic solvent, affinity for an organic functional compound, and the like, one type or plural types of the exemplary monomers are selected.

Specific examples of the specific polymer will be provided below by describing the constituent units. Inside the parentheses is the weight ratio of the constituent unit. The present invention is not limited to these compounds P01 to P18.

P01: phenoxyethyl methacrylate/methyl methacrylate/2-carboxyethyl acrylate copolymer (40/50/10)

P02: phenoxyethyl acrylate/benzyl methacrylate/isobutyl methacrylate/2-carboxyethyl acrylate copolymer (30/35/25/10)

P03: phenoxyethyl acrylate/methyl methacrylate/acrylic acid/2-carboxyethyl acrylate copolymer (50/40/2/8)

PO4: phenoxyethyl methacrylate/isobutyl methacrylate/2-acrylamide-2-methylpropanesulfonic acid/2-carboxyethyl acrylate copolymer (50/43/2/5)

P05: styrene/ethyl methacrylate/2-carboxyethyl acrylate copolymer (30/54/16)

P06: styrene/butyl acrylate/ethyl methacrylate/2-carboxyethyl acrylate copolymer (30/15/49/6)

P07: styrene/butyl acrylate/ethyl methacrylate/2-carboxyethyl acrylate copolymer (30/15/45/10)

P08: styrene/phenoxyethyl acrylate/methyl methacrylate/2-carboxyethyl acrylate copolymer (10/50/30/10)

P09: styrene/methyl methacrylate/methoxypolyethylene glycol methacrylate (n=23)/2-carboxyethyl acrylate copolymer (25/60/5/10)

P10: 4-t-butylstyrene/phenoxyethyl acrylate/isobutyl methacrylate/2-carboxyethyl acrylate copolymer (5/50/35/10)

P11: benzyl acrylate/methyl methacrylate/2-carboxyethyl acrylate copolymer (54/40/6)

P12: benzylacrylate/ethylmethacrylate/methoxypolyethylene glycol methacrylate (n=9)/2-carboxyethyl acrylate copolymer (50/37/5/8)

P13: benzyl acrylate/ethyl methacrylate/styrene carboxylic acid (vinyl benzoate)/2-carboxyethyl acrylate copolymer (45/45/3/7)

P14: benzyl methacrylate/phenoxyethyl methacrylate/methyl methacrylate/mono phosphate 2-(meth)acryloyloxyethyl/2-carboxyethyl acrylate copolymer (30/30/30/4/6)

P15: benzyl methacrylate/butyl acrylate/2-carboxyethyl acrylate copolymer (85/5/10)

P16: benzyl methacrylate/methyl methacrylate/ethoxy triethylene glycol methacrylate/2-carboxyethyl acrylate copolymer (60/15/15/10)

P17: methyl methacrylate/butyl methacrylate/2-carboxyethyl acrylate copolymer (75/19/6)

P18: methyl methacrylate/hexyl acrylate/2-carboxyethyl acrylate copolymer (85/5/10)

The specific polymer includes 2-carboxyethyl (meth)acrylate as a constituent unit within a range where the acid value is from 7 mg KOH/g to 100 mg KOH/g. The ratio of 2-carboxyethyl (meth)acrylate with respect to all the constituent units constituting the specific polymer is, for example, from 2% by weight to 26% by weight, and preferably from 2% by weight to 15% by weight.

The ratio of alkyl (meth)acrylate with respect to all the constituent units constituting the specific polymer is, for example, from 10% by weight to 90% by weight, and preferably from 20% by weight to 80% by weight.

The molecular weight range of the specific polymer is preferably from 3,000 to 200,000 as the weight average molecular weight, more preferably from 5,000 to 150,000, and even more preferably from 10,000 to 100,000. The weight average molecular weight being 3,000 or more reduces the content ratio of the water-soluble component described below, which is suitable for dispersing the organic functional compound. On the other hand, since the weight average molecular weight being 200,000 or less causes an excellent solubility in an organic solvent and prevents an increase in the viscosity of a polymer solution dissolved in an organic solvent, it is easy to carry out the dispersion in an aqueous medium when preparing a polymer dispersion or a functional particle dispersion, thus, excellent dispersion stability of the specific polymers and functional particles is obtained.

The weight average molecular weight of the polymer is measured by gel permeation chromatography (GPC) and calculated in terms of polystyrene.

The glass transition temperature of the specific polymer is preferably from 40° C. to 150° C. The glass transition temperature being 40° C. or more provides an excellent scratch resistance and blocking resistance of an image formed using an ink containing a specific polymer, and the glass transition temperature being 150° C. or less provides an excellent abrasion resistance of the image formed using an ink which includes a specific polymer. From this viewpoint, the glass transition temperature of the specific polymer is more preferably from 60° C. to 140° C., and even more preferably from 70° C. to 130° C.

When the specific polymer is formed into a polymer dispersion, the ratio of the water-soluble component to the solid content included in the dispersion is preferably 10% by weight or less.

Normally, the individual molecules forming the aggregate of the polymer have variations in the composition of the constituent units and, accordingly, the solubility of the individual molecules in water varies. A polymer molecule having a relatively high solubility in water corresponds to the "water-soluble component" referred to herein. Since a water-soluble component, that is, a polymer molecule having a relatively high solubility in water is not suitable for dispersing the organic functional compound, when the specific polymer is formed into a polymer dispersion, the water-soluble component included in the dispersion is preferably as little as possible. In addition, also from the viewpoint of preventing the swelling of particles containing a specific polymer and the adhesion between particles and maintaining a stable dispersion, when the specific polymer is formed into a polymer dispersion, the water-soluble component included in the dispersion is preferably as little as possible. From these viewpoints, when a specific polymer is formed into a dispersion, the ratio of the water-soluble component to the solid content included in the dispersion is preferably 10% by weight or less, more preferably 8% by weight or less, even more preferably 5% by weight or less, and the smaller the better.

The content ratio of the water-soluble component is measured by the following method.

A polymer dispersion (solid content concentration: 10% by weight, liquid temperature: 23±0.5° C.) in which a polymer is dispersed in water is prepared. At that time, a neutralizing agent is used as necessary for dispersion of the polymer. The polymer dispersion is centrifuged into a dispersoid and a medium using a centrifugal ultrafiltration filter unit, the separated medium is dried, the mass of dry matter is dried, and the ratio of the dried solid content of the medium with respect to the solid content of the polymer dispersion (the amount of the polymer used for preparing the polymer dispersion+the weight of the neutralizing agent used in the process of preparing the polymer dispersion) is calculated and set as the ratio (% by weight) of the water-soluble component.

[Aqueous Medium]

The medium of the polymer dispersion according to the exemplary embodiment is water or a mixed solvent containing water as a main solvent. The mixed solvent is, for example, a mixture of water and a water-soluble organic solvent.

As water, purified water such as distilled water, ion exchanged water, ultra-filtered water, or the like is preferable from the viewpoint of preventing the introduction of impurities or the generation of microorganisms.

Examples of water-soluble organic solvents include alcohols, polyols, polyol derivatives, nitrogen-containing solvents, sulfur-containing solvents, and the like. The water-soluble organic solvent included in the polymer dispersion is, for example, a residue of the organic solvent used for dissolving the specific polymer in the process of preparing the polymer dispersion.

The content of water is preferably from 50% by weight to 95% by weight with respect to the total weight of the polymer dispersion, and more preferably from 60% by weight to 90% by weight.

The content of the water-soluble organic solvent is preferably 30% by weight or less with respect to the total weight of the polymer dispersion, and more preferably 10% by weight or less.

[Other Components]

The polymer dispersion according to the exemplary embodiment may include a neutralizing agent, a surfactant, a dispersion stabilizer, a polymer other than the specific polymer, and the like.

[Method for Preparing Polymer Dispersion]

Examples of a method for preparing the polymer dispersion include a phase inversion emulsification method.

In the phase inversion emulsification method, a solution in which a specific polymer is dissolved in an organic solvent is prepared, a neutralizing agent is added to the solution to neutralize the specific polymer, then water is slowly mixed in to set the specific polymer to a dispersed state. The dispersed state here may be an emulsification or a suspension, and a suspension is preferable from the viewpoint of dispersion stability. In a case where the solubility of the organic solvent in water is 10% by weight or less or in a case where the vapor pressure of the organic solvent is greater than that of water, the organic solvent is preferably removed from the viewpoint of dispersion stability of the specific polymer. The neutralization is not an essential step; however, in a case where the specific polymer has a non-neutralized dissociable group, the neutralization is preferably performed from the viewpoint of pH preparation of the dispersion and the like.

The organic solvent used in the phase inversion emulsification method is selected based on the solubility of the specific polymer. Specific examples thereof include ketone solvents such as acetone, methyl ethyl ketone, diethyl ketone, and the like; alcohol solvents such as methanol, ethanol, 2-propanol, 1-propanol, 1-butanol, and tert-butanol; chlorine solvents such as chloroform, and methylene chloride; aromatic solvents such as benzene and toluene; ester solvents such as ethyl acetate, butyl acetate, and isopropyl acetate; ether solvents such as diethyl ether, tetrahydrofuran, and dioxane; glycol ether solvents such as ethylene glycol monomethyl ether and ethylene glycol dimethyl ether; and the like. One type of these organic solvents may be used, or two or more types may be used in combination.

The amount of the organic solvent used is preferably from 10 parts by weight to 2,000 parts by weight with respect to 100 parts by weight of the specific polymer, and more preferably from 100 parts by weight to 1,000 parts by weight. When the amount of the organic solvent used is 10 parts by weight or more with respect to 100 parts by weight of the specific polymer, the dispersion of the specific polymer is stabilized and when the amount of the organic solvent used is 2,000 parts by weight or less with respect to 100 parts by weight of the specific polymer, a step of removing the organic solvent is unnecessary or is completed in a short time.

Examples of the neutralizing agents used in the phase inversion emulsification method include an organic base and an inorganic alkali, since the specific polymer has an anionic group. Examples of the organic base include triethanolamine, diethanolamine, N-methyldiethanolamine, dimethylethanolamine, and the like. Examples of the inorganic alkali include hydroxides of alkali metals (for example, sodium hydroxide, lithium hydroxide, potassium hydroxide, and the like), carbonates (for example, sodium carbonate, sodium hydrogen carbonate, and the like), ammonia, and the like.

From the viewpoint of the dispersion stability of the specific polymer, the addition amount of the neutralizing agent is preferably such that the pH of the polymer dispersion is within the range described below.

[Properties of Polymer Dispersion]

From the viewpoint of dispersion stability, the volume average particle size of the dispersion of the specific polymer included in the polymer dispersion is preferably from 5 nm to 150 nm, more preferably from 5 nm to 120 nm, even more preferably from 10 nm to 100 nm, and still more preferably from 10 nm to 80 nm. The particle size distribution may be either a broad particle size distribution or a monodisperse particle size distribution. The average particle size and particle size distribution of the dispersion of the specific polymer are measured, for example, using a light scattering method.

From the viewpoint of reducing the content ratio of the water-soluble component in the polymer dispersion, the pH of the polymer dispersion according to the exemplary embodiment is preferably 9.5 or less, more preferably 9.0 or less, even more preferably 8.5 or less, and still more preferably 8.0 or less. On the other hand, from the viewpoint of the dispersion stability of the specific polymer, the pH of the polymer dispersion according to the exemplary embodiment is preferably 6.0 or more, more preferably 6.5 or more, and even more preferably 7.0 or more.

In the exemplary embodiment, the pH of the polymer dispersion is measured in an environment of a temperature of 23±0.5° C. and a relative humidity of 55±5%.

The surface tension of the polymer dispersion according to the exemplary embodiment is preferably from 20 mN/m to 40 mN/m, and more preferably from 25 mN/m to 35 mN/m. In the exemplary embodiment, the surface tension of the polymer dispersion is measured using a WILHELMY type surface tension meter in an environment of a temperature of 23±0.5° C. and a relative humidity of 55±5%.

The viscosity of the polymer dispersion according to the exemplary embodiment is preferably from 1 mPa·s to 30 mPa·s, and more preferably from 2 mPa·s to 20 mPa·s. In the exemplary embodiment, the viscosity of the polymer dispersion is measured under the conditions of a temperature of 23±0.5° C. and a shear rate of 1,400 s$^{-1}$ using a TV-20 TYPE VISCOMETER (TOKI SANGYO CO., LTD.) as a measuring apparatus.

<Functional Particle Dispersion>

The functional particle dispersion according to the exemplary embodiment is a dispersion including an aqueous medium with functional particles dispersed in the aqueous medium, and the functional particles contain a specific polymer and an organic functional compound.

In the related art, in order to incorporate an organic compound having an organic compound insoluble or hardly soluble in water among organic functional compounds such as dyes and infrared absorbing agents in an aqueous medium, a technique is known for making particles containing both the organic functional compound and the polymer and dispersing the particles in an aqueous medium.

In the exemplary embodiment, there is provided a functional particle dispersion containing an organic functional compound and a specific polymer, in which particles containing both the organic functional compound and the specific polymer are dispersed, and the organic functional compound is stably dispersed in an aqueous medium. In the exemplary embodiment, the specific polymer acts as a dispersing agent for the organic functional compound.

Since the specific polymer includes 2-carboxyethyl (meth)acrylate as a constituent unit, the specific polymer can be stably dispersed even when the pH of the aqueous medium is near neutral (for example, pH 6.0 to 9.5). Among the organic functional compounds, there are compounds which are liable to be decomposed as the pH of the medium becomes farther away from neutral and, using the specific polymer makes it possible to set the pH of the functional particle dispersion to near neutral, thus, the exemplary embodiment makes it possible to prevent the decomposition of the organic functional compound and prevent decreases in the target function over time.

The specific polymer has an acid value of from 7 mg KOH/g to 100 mg KOH/g. When the acid value of the polymer including 2-carboxyethyl (meth)acrylate and alkyl (meth)acrylate as constituent units is less than 7 mg KOH/g, since the dispersibility of the polymer in an aqueous medium is relatively low, the dispersion stability of the functional particles is inferior. On the other hand, when the acid value of the polymer including 2-carboxyethyl (meth)acrylate and alkyl (meth)acrylate as constituent units exceeds 100 mg KOH/g, since the water solubility of the polymer is relatively high, it is difficult to the form particles containing the polymer and the organic functional compound, and it is therefore difficult to obtain functional particles stably dispersed in an aqueous medium. From these viewpoints, the lower limit of the acid value of the specific polymer is 7 mg KOH/g or more, preferably 8 mg KOH/g or more, and more preferably 10 mg KOH/g or more, while the upper limit is 100 mg KOH/g or less, preferably 80 mg KOH/g or less, and more preferably 60 mg KOH/g or less.

The functional particle dispersion according to the exemplary embodiment is excellent in the dispersion stability of functional particles. Therefore, according to the exemplary embodiment, it is difficult for aggregates to be generated in the process of preparing the dispersion of the functional particles, and the yield of the functional particles is high. In addition, according to the exemplary embodiment, a dispersion in which functional particles having a small particle size (for example, a volume average particle size of 150 nm or less) are dispersed is obtained.

In the functional particle dispersion according to the exemplary embodiment, the dispersed state of the functional particles may be an emulsion in which liquid particles are dispersed or may be a suspension in which solid particles are dispersed, and from the viewpoint of dispersion stability, a suspension in which solid particles are dispersed is preferable.

That is, the functional particle dispersion according to the exemplary embodiment may be an emulsion in which the functional particles are dispersed in an aqueous medium in a liquid state, or a suspension in which the functional particles are dispersed in an aqueous medium in a solid state and, from the viewpoint of dispersion stability of the functional particles, a suspension is preferable.

Details of the specific polymer in the functional particle dispersion according to the exemplary embodiment are as described above.

[Organic Functional Compound]

In the exemplary embodiment, as the organic functional compound, an organic compound which is insoluble or hardly soluble in water and soluble in an organic solvent is suitable, and aromatic compounds are preferable from the viewpoint of affinity with the specific polymer.

Examples of the organic functional compound include a dye, an infrared absorbing agent, an ultraviolet absorbing agent, and the like. One type of these organic functional compounds may be used, or two or more types may be used in combination. A combination of two or more types may be plural types from one compound group having the same function (for example, plural types from the dye), or plural types over two or more compound groups having different functions (for example, one type from dyes and one type from infrared absorbing agents).

Examples of dyes include an arylazo dye or a heterylazo dye having phenols, naphthols, anilines, pyrazolones, pyridones, or open-chain active methylene compounds as a coupling component; azomethine dyes having pyrazolones, pyrazolotriazoles, pyrrolotriazoles or open chain active methylene compounds as a coupling component; methine dyes such as benzylidene dyes and monomethine oxonol dyes; quinone dyes such as naphthoquinone dyes, anthraquinone dyes, and anthrapyridone dyes; methine dyes such as arylidene dyes, styryl dyes, merocyanine dyes, and oxonol dyes; carbonium dyes such as diphenylmethane dyes, triphenylmethane dyes, and xanthene dyes; quinophthalone dyes, nitro dyes, nitroso dyes, acridine dyes, acridinone dyes, dioxazine dyes, indoaniline dyes, indophenol dyes, cyanine dyes, phthalocyanine dyes, indigo dyes, thioindigo dyes, and the like.

In the exemplary embodiment, in a case where a dye is used as the organic functional compound, the functional particles included in the functional particle dispersion are colored particles, and the functional particle dispersion is a colored particle dispersion. The colored particle dispersion is used, for example, as a material forming an aqueous ink.

Examples of the infrared absorbing agent include squarylium dyes, croconium dyes, naphthalocyanine dyes, cyanine dyes, aminium dyes, and the like.

In the exemplary embodiment, in a case where an infrared absorbing agent is used as the organic functional compound, the functional particles included in the functional particle dispersion are infrared absorbing particles, and the functional particle dispersion is an infrared absorbing particle dispersion. The infrared absorbing particle dispersion is used, for example, as a material forming an aqueous ink to be fixed on a recording medium by infrared irradiation.

Examples of the ultraviolet absorbing agent include benzotriazole compounds, benzophenone compounds, and the like.

In the exemplary embodiment, in a case where an ultraviolet absorbing agent is used as the organic functional compound, the functional particles included in the functional particle dispersion are ultraviolet absorbing particles, and the functional particle dispersion is an ultraviolet ray-absorbing particle dispersion. The ultraviolet ray-absorbing particle dispersion is used, for example, as a material forming an aqueous ink for the purpose of preventing the fading of an image due to ultraviolet rays.

[Aqueous Medium]

The medium of the functional particle dispersion according to the exemplary embodiment is water or a mixed solvent containing water as a main solvent. The mixed solvent is, for example, a mixture of water and a water-soluble organic solvent. Examples of water-soluble organic solvents include alcohols, polyols, polyol derivatives, nitrogen-containing solvents, sulfur-containing solvents, and the like. The water-soluble organic solvent included in the functional particle dispersion is, for example, a residue of an organic solvent used for dissolving the organic functional compound or the specific polymer in the process of preparing the functional particle dispersion. The details of water and the water-soluble organic solvent in the functional particle dispersion are the same as those described for the polymer dispersion.

The content of water is preferably from 50% by weight to 95% by weight with respect to the total weight of the functional particle dispersion, and more preferably from 60% by weight to 90% by weight.

The content of the water-soluble organic solvent is preferably 30% by weight or less with respect to the total weight of the functional particle dispersion, and more preferably 10% by weight or less.

[Other Components]

The functional particle dispersion according to the exemplary embodiment may contain a neutralizing agent, a surfactant, a dispersion stabilizer, a polymer other than the specific polymer, and the like.

[Method for Preparing Functional Particle Dispersion]

Examples of a method for preparing the functional particle dispersion include a phase inversion emulsification method and an impregnation method in which particles of a specific polymer are impregnated with an organic functional compound, and the phase inversion emulsification method is preferable.

The phase inversion emulsification method is a method of preparing a solution in which an organic functional compound and a specific polymer are dissolved in an organic solvent, neutralizing the specific polymer by adding a neutralizing agent to the solution, then slowly mixing water therein to obtain particles containing both the organic functional compound and the specific polymer, in a dispersion state. Note that, the dispersion state may be an emulsification in which liquid particles are dispersed, or a suspension in which solid particles are dispersed, and from the viewpoint of dispersion stability, a suspension in which solid particles are dispersed is preferable. From the viewpoint of dispersion stability of the functional particles, the organic solvent is preferably removed in a case where the solubility of the organic solvent in water is 10% by weight or less or in a case where the vapor pressure of the organic solvent is larger than water. The neutralization is not an essential step; however, in a case where the specific polymer has a non-neutralized dissociable group, the neutralization is preferably performed from the viewpoint of pH adjustment of the dispersion and the like.

The impregnation method is a method of preparing a particle dispersion of a specific polymer, mixing the particle dispersion and a solution in which the organic functional compound is dissolved in the organic solvent, and then slowly removing the organic solvent to impregnate the particles of the specific polymer with the organic functional compound to obtain functional particles. The particles of the specific polymer may be liquid particles or may be solid particles and, from the viewpoint of dispersion stability, solid particles are preferable. The particle dispersion of the specific polymer is prepared, for example, by preparing a solution in which the specific polymer is dissolved, neutralizing the solution by adding a neutralizing agent thereto, and then removing the organic solvent while slowly mixing water therein.

The organic solvent used for the phase inversion emulsification method and the impregnation method is selected based on the solubility of the organic functional compound and the solubility of the specific polymer. Specific examples thereof include ketone solvents such as acetone, methyl ethyl ketone, diethyl ketone and the like; alcohol solvents such as methanol, ethanol, 2-propanol, 1-propanol, 1-butanol, and tert-butanol; chlorine solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; glycol ether solvents such as ethylene glycol monomethyl ether, and ethylene glycol dimethyl ether; and the like. One type of these organic solvents may be used, or two or more types may be used in combination.

The amount of the organic solvent used is preferably from 10 parts by weight to 2,000 parts by weight with respect to 100 parts by weight of the specific polymer, and more preferably from 100 parts by weight to 1,000 parts by weight. When the amount of the organic solvent used is 10 parts by weight or more with respect to 100 parts by weight of the specific polymer, the dispersion of the functional particles is stabilized, and when the amount of the organic solvent used is 2,000 parts by weight or less with respect to 100 parts by weight of the specific polymer, the step of removing the organic solvent is unnecessary or is completed in a short time.

Examples of the neutralizing agent used in the phase inversion emulsification method and the impregnation method include an organic base and an inorganic alkali since the specific polymer has an anionic group. Examples of the organic base include triethanolamine, diethanolamine, N-methyldiethanolamine, dimethylethanolamine, and the like. Examples of the inorganic alkali include hydroxides of alkali metals (for example, sodium hydroxide, lithium hydroxide, potassium hydroxide, and the like), carbonates (for example, sodium carbonate, sodium hydrogen carbonate, and the like), ammonia and the like.

From the viewpoint of the dispersion stability of the functional particles, the addition amount of the neutralizing agent is preferably such that the pH of the functional particle dispersion is within the range described below.

The amount of the specific polymer used in the phase inversion emulsification method and the impregnation method and the content of the specific polymer included in the functional particle dispersion are preferably from 100 parts by weight to 9,900 parts by weight with respect to 100 parts by weight of the organic functional compound, and more preferably from 300 parts by weight to 4,900 parts by weight. When the amount of the specific polymer used (the content of the specific polymer) is 100 parts by weight or more with respect to 100 parts by weight of the organic functional compound, the dispersion of the organic functional compound is stabilized, and when the amount of the specific polymer used (the content of the specific polymer) is 9,900 parts by weight or less with respect to 100 parts by weight of the organic functional compound, the desired function of the functional particle is excellent.

[Physical Properties of Functional Particle Dispersion]

The volume average particle size of the functional particles included in the functional particle dispersion is preferably from 5 nm to 150 nm, more preferably from 5 nm to 120 nm, even more preferably from 10 nm to 100 nm, and still more preferably from 10 nm to 80 nm. The volume average particle size being 5 nm or more provides an excellent light fastness of the functional particles, and the volume average particle size being 150 nm or less provides excellent droplet ejection characteristics of the ink jet system. The particle size distribution may be either a broad particle size distribution or a monodisperse particle size distribution. The average particle size and particle size distribution of the functional particles are measured, for example, according to a light scattering method.

From the viewpoint of preventing the decomposition of the organic functional compound and preventing a decrease in the target function over time, the pH of the functional particle dispersion according to the exemplary embodiment is preferably 9.5 or less, more preferably 9.0 or less, even more preferably 8.5 or less, and still more preferably 8.0 or less. On the other hand, from the viewpoint of stably dispersing the functional particles, the pH of the functional particle dispersion according to the exemplary embodiment is preferably 6.0 or more, more preferably 6.5 or more, and even more preferably 7.0 or more.

In addition, since general aqueous inks are alkaline (approximately pH 8 to 10), from the viewpoint of preparing an aqueous ink using the functional particle dispersion according to the exemplary embodiment, the pH of the functional particle dispersion according to the exemplary embodiment is preferably in the ranges described above.

In the exemplary embodiment, the pH of the functional particle dispersion is measured in an environment of a temperature of 23±0.5° C. and a relative humidity of 55±5%.

The surface tension of the functional particle dispersion according to the exemplary embodiment is preferably from 20 mN/m to 40 mN/m, and more preferably from 25 mN/m to 35 mN/m. In the exemplary embodiment, the surface tension of the functional particle dispersion is measured using a WILHELMY type surface tension meter in an environment of a temperature of 23±0.5° C. and a relative humidity of 55±5%.

The viscosity of the functional particle dispersion according to the exemplary embodiment is preferably from 1 mPa·s to 30 mPa·s or less, and more preferably from 2 mPa·s to 20 mPa·s or less. In the exemplary embodiment, the viscosity of the functional particle dispersion is measured under conditions of a temperature of 23±0.5° C. and a shear rate of 1,400 $s^{-1}$ using a TV-20 TYPE VISCOMETER (TOKI SANGYO CO., LTD.) as a measuring apparatus.

<Aqueous Ink>

The aqueous ink according to the exemplary embodiment is an aqueous ink including an aqueous medium with functional particles dispersed in the aqueous medium, in which the functional particles contain a specific polymer and an organic functional compound.

The details of the specific polymer, the organic functional compound, and the functional particles in the aqueous ink according to the exemplary embodiment are as described for the functional particle dispersion according to the exemplary embodiment.

For example, the aqueous ink according to the exemplary embodiment includes the functional particle dispersion according to the exemplary embodiment itself; a composition obtained by mixing plural forms of the functional particle dispersion according to the exemplary embodiment; a composition in which a coloring agent or the like is added to the functional particle dispersion according to the exemplary embodiment; a composition in which the functional particle dispersion according to the exemplary embodiment is added to a commercially available aqueous ink; and the like.

[Aqueous Medium]

The medium for the aqueous ink is water or a mixed solvent mainly containing water. The mixed solvent is, for example, a mixture of water and a water-soluble organic solvent. Examples of water-soluble organic solvents include alcohols, polyols, polyol derivatives, nitrogen-containing solvents, sulfur-containing solvents, and the like. The details of the water and the water-soluble organic solvent in the aqueous ink are the same as those described for the polymer dispersion.

The content of water is preferably from 40% by weight to 80% by weight with respect to the total weight of the aqueous ink, and more preferably from 50% by weight to 80% by weight.

The content of the water-soluble organic solvent is preferably 50% by weight or less with respect to the total weight of the aqueous ink, and more preferably 40% by weight or less.

[Additives]

The aqueous ink according to the exemplary embodiment may include various types of additives as necessary. Examples of the additives include a surfactant, a penetrant, a viscosity adjusting agent, a pH adjusting agent, a pH buffering agent, an antioxidant, a preservative, a fungicide, and the like.

[Properties of Aqueous Ink]

The pH of the aqueous ink according to the exemplary embodiment is preferably from 6.5 to 9.5, more preferably from 7.0 to 9.0, and even more preferably from 7.0 to 8.5. In the exemplary embodiment, the pH of the aqueous ink is measured in an environment of a temperature of 23±0.5° C. and a relative humidity of 55±5%.

The surface tension of the aqueous ink according to the exemplary embodiment is preferably from 20 mN/m to 40 mN/m or less, and more preferably from 25 mN/m to 35 mN/m or less. In the exemplary embodiment, the surface tension of the aqueous ink is measured using a WILHELMY type surface tension meter in an environment of a temperature of 23±0.5° C. and a relative humidity of 55±5%.

The viscosity of the aqueous ink according to the exemplary embodiment is preferably from 1 mPa·s to 30 mPa·s or less, and more preferably from 2 mPa·s to 20 mPa·s or less. In the exemplary embodiment, the viscosity of the aqueous ink is measured under the conditions of a temperature of 23±0.5° C. and a shear rate of 1,400 $s^{-1}$ using a TV-20 TYPE VISCOMETER (TOKI SANGYO CO., LTD.) as a measuring apparatus.

<Ink Cartridge>

The ink cartridge according to the exemplary embodiment is a cartridge accommodating the aqueous ink according to the exemplary embodiment. The ink cartridge according to the exemplary embodiment is, for example, provided in a form that is detachable from an ink jet type recording apparatus.

<Recording Apparatus and Recording Method>

The recording apparatus according to the exemplary embodiment is provided with an ink applying unit for accommodating the aqueous ink according to the exemplary embodiment and applying the aqueous ink to the recording medium, and a drying unit for drying the aqueous ink applied to the recording medium. The recording apparatus according to the exemplary embodiment realizes a recording method including an ink applying step of applying the aqueous ink according to the exemplary embodiment to a recording medium and a drying step of drying the aqueous ink applied to the recording medium.

Examples of the ink applying unit in the exemplary embodiment include: an ejecting unit for ejecting ink by an inkjet system; a coating unit using a roller, a spray, a sponge or the like; a printing unit using offset printing, screen printing, gravure printing, relief printing, or the like.

The ink applying unit in the exemplary embodiment is preferably an ejecting unit for ejecting ink using an ink jet system. A recording apparatus and a recording method applying the ink jet system are excellent in ejection stability due to using the aqueous ink according to the exemplary embodiment.

Examples of the drying unit for drying the aqueous ink applied to the recording medium in the exemplary embodiment include an infrared irradiation unit for irradiating infrared rays; a contact-type heating unit such as a heating roller, a heating drum, or a heating belt; a warm air blowing unit composed of a heater and a blower; and combinations thereof.

Examples of the recording medium include paper, paper coated with resin, and films and plates made of resin, metal, glass, ceramics, silicon, rubber, or the like.

The recording apparatus according to the exemplary embodiment may be provided with an ink cartridge accommodating the aqueous ink according to the exemplary embodiment and formed into a cartridge so as to be detachable from the recording apparatus.

Description will be given below of an example of the recording apparatus and the recording method according to the exemplary embodiment with reference to the drawings.

FIG. 1 is a schematic configuration diagram which shows an example of a recording apparatus according to the exemplary embodiment. A recording apparatus 12 shown in FIG. 1 is an ink jet type recording apparatus.

The recording apparatus 12 shown in FIG. 1 includes, in a housing 14, a container 16 which accommodates a recording medium P before image recording, an endless transport belt 28 stretched around a driving roller 24 and a driven roller 26, ink ejection heads (ink ejection heads 30Y, 30M, 30C, and 30K, collectively referred to as an ink ejection head 30) as an example of an ink applying unit, a drying unit (drying unit 50Y, 50M, 50C, and 50K, collectively referred to as a drying unit 50), and a container 40 which accommodates the recording medium P after image recording.

Between the container 16 and the transport belt 28 is a transport path 22 through which the recording medium P before image recording is transported, and a roller 18 for picking up the recording medium P one by one from the container 16, and plural roller pairs 20 for transporting the recording medium P are arranged on the transport path 22. A charging roller 32 is arranged on the upstream side of the transport belt 28. The charging roller 32 is driven while nipping the transport belt 28 and the recording medium P between itself and the driven roller 26 to generate an electric potential difference between the charging roller 32 and the grounded driven roller 26, and apply an electric charge to the recording medium P such that the recording medium P is electrostatically attracted to the transport belt 28.

The ink ejection head 30 is arranged above the transport belt 28 so as to face the flat portion of the transport belt 28. A region where the ink ejection head 30 and the transport belt 28 face each other is a region where ink droplets are ejected from the ink ejection head 30.

Each of the ink ejection heads 30Y, 30M, 30C, and 30K is respectively a head for recording a Y (yellow) image, a head for recording an M (magenta) image, a head for recording a C (cyan) image, and a head for recording a K (black) image. The ink ejection heads 30Y, 30M, 30C, and 30K are, for example, lined up in this order from the upstream side to the downstream side of the transport belt 28. The ink ejection heads 30Y, 30M, 30C, and 30K are respectively connected through supply pipes (not shown) to ink cartridges 31Y, 31M, 31C, and 31K of each color to be detachable from the recording apparatus 12, and inks of each colors are supplied from the ink cartridges to the ejection head.

Examples of the ink ejection head 30 include a long head in which the effective recording region (the region where the nozzles ejecting the ink are arranged) is set to be the width or more of the recording medium P (the length of the recording medium P in the direction orthogonal to the transport direction), or a carriage-type head which is shorter than the width of the recording medium P and which moves in the width direction of the recording medium to eject ink.

Examples of the ink jet system adopted by the ink ejection head 30 include a piezo system utilizing the vibration pressure of a piezo element; a charge control system which ejects ink by utilizing electrostatic attraction; an acoustic ink jet system in which an electric signal is converted into an acoustic beam to irradiate the ink and the ink is ejected using radiation pressure; a thermal ink jet system in which bubbles are formed by heating the ink in order to utilize the generated pressure.

For example, the ink ejection head 30 is a low-resolution recording head (for example, 600 dpi recording head) which ejects ink droplets in a range of an ink droplet amount of from 10 pL to 15 pL or a high-resolution recording head (for example, a recording head of 1,200 dpi) which ejects ink droplets of 10 pL or less dpi means "dots per inch".

The recording apparatus 12 is not limited to a configuration provided with four ink ejection heads. The recording apparatus 12 may take a form provided with four or more ink ejection heads in which intermediate colors are added to Y, M, C, and K, or a form provided with one ink ejection head and recording an image of only one color.

On the downstream side of the ink ejection head 30, the drying unit 50Y, 50M, 50C, and 50K are arranged above the transport belt 28 for each ink ejection head of each color. The drying unit 50 dries the ink applied to the recording medium P.

In a case where the recording apparatus 12 uses an aqueous ink containing an infrared absorbing agent, the drying unit 50 is preferably an infrared radiation unit. In a case where the recording apparatus 12 uses an aqueous ink not containing an infrared absorbing agent, at least one of the contact-type heating unit and the warm air blowing unit is preferable as the drying unit 50.

Example of the drying unit 50 include an infrared irradiation apparatus 60 (an example of an infrared irradiation unit) which irradiates the ink on the recording medium P with infrared rays. The recording apparatus 12 is provided with, for example, infrared irradiation apparatuses 60Y, 60M, 60C, and 60K downstream of each of the ink ejection heads 30Y, 30M, 30C, and 30K. Examples of the light source of the infrared irradiation apparatuses 60 include light emitting diodes, semiconductor lasers, surface emitting semiconductor lasers, halogen lamps, and xenon lamps.

Examples of the infrared irradiation apparatus 60 include a long infrared irradiation apparatus in which an effective infrared irradiation region (the region where the light source which irradiates infrared rays is arranged) is set to be equal to or wider than the width of the region recorded by the ink ejection head 30, and a carriage-type infrared irradiation apparatus which is an infrared irradiation apparatus shorter than the width of the region recorded by the ink ejection head 30 and which moves in the width direction of the recording medium P to irradiate infrared rays.

The irradiation conditions of the infrared irradiation apparatus 60 are set according to the infrared absorption performance of the infrared absorbing agent included in the ink, the water content in the ink, and the like. As the irradiation conditions, irradiation conditions for drying the amount of water in the ink applied on the recording medium P to 10% by weight or less are preferable. Specifically, the irradiation conditions are a central wavelength of 700 nm to 1,200 nm or less (preferably from 780 nm to 980 nm or less), an irradiation intensity of from 0.1 J/cm$^2$ to 10 J/cm$^2$ (preferably from 1 J/cm$^2$ to 3 J/cm$^2$), and an irradiation time of from 0.1 milliseconds to 10 seconds (preferably from 10 milliseconds to 100 milliseconds).

The recording apparatus 12 is not limited to a form in which the infrared irradiation apparatus is provided for each ink ejection head of each color, but may be a form provided with only one infrared irradiation apparatus on the downstream side of the ink ejection head furthest downstream. The recording apparatus 12 may be provided with at least one of the contact-type heating unit and the warm air blowing unit as the ink drying unit together with the infrared irradiation apparatus 60.

In the case where the drying unit 50 is at least one of the contact-type heating unit and the warm air blowing unit in the recording apparatus 12, for example, drying is carried out under conditions such that the surface temperature of the recording medium is increased in a range of 50° C. to 120° C.

On the downstream side of the drying unit 50, a peeling plate 34 is arranged to face the driving roller 24. The peeling plate 34 separates the recording medium P from the transport belt 28.

Between the transport belt 28 and the container 40 is a transport path 36 on which the recording medium P is transported after image recording, and plural roller pairs 38 for transporting the recording medium P are arranged on the transport path 36.

Description will be given of the operation of the recording apparatus 12.

The recording medium P before image recording is taken out one by one by the roller 18 from the container 16 and is transported to the transport belt 28 by the plural roller pairs 20.

Next, the recording medium P is electrostatically attracted to the transport belt 28 by the charging roller 32, and is transported to the lower side of the ink ejection head 30 by the rotation of the transport belt 28.

Next, ink is ejected from the ink ejection head 30 onto the recording medium P, and an image is recorded.

Subsequently, the ink on the recording medium P is dried by the drying unit 50. In the case where the drying unit 50 is the infrared irradiation apparatus 60, infrared rays are irradiated from the infrared irradiation apparatus 60 and, in the ink containing the infrared absorbing agent, the infrared absorbing agent in the ink generates heat, the ink temperature rises, and the ink dries.

Next, the recording medium P on which the ink is dried and the image is fixed is separated from the transport belt 28 by the peeling plate 34, and is transported to the container 40 by plural roller pairs 38.

The recording apparatus according to the exemplary embodiment is not limited to a form in which ink is directly applied from the ink applying unit to the recording medium, but may be also be applied to a form in which ink on the intermediate transfer member is transferred to the recording medium after the ink is applied to the intermediate transfer member from the ink applying unit.

The recording apparatus according to the exemplary embodiment is not limited to a sheet-fed machine as an example of the recording apparatus 12 shown in FIG. 1, but may be a rotary press.

EXAMPLES

Detailed description will be given below of embodiments of the invention using Examples, but the embodiments of the invention are not limited to these Examples. In the following description, unless otherwise noted, all "parts" are on a weight basis.

Example 1: Synthesis of Polymer

[Synthesis of Polymer P01]

25 parts of methyl ethyl ketone are put into a three-necked flask provided with a stirrer, a thermometer, a reflux condenser, and a nitrogen gas inlet tube, and heated to 80° C. While maintaining the inside temperature of the reaction container at 80° C., a mixed solution composed of 40 parts of 2-phenoxyethyl methacrylate (PHE-1G manufactured by SHIN-NAKAMURA CHEMICAL CO., LTD.), 50 parts of methyl methacrylate (manufactured by WAKO PURE CHEMICAL INDUSTRIES, LTD.), 10 parts of 2-carboxyethyl acrylate (SIPOMER β-CEA, manufactured by SOLVAY NICCA), 70 parts of methyl ethyl ketone, and 2 parts of a polymerization initiator (V-601, manufactured by WAKO PURE CHEMICAL INDUSTRIES, LTD., the same applies below) is added dropwise over 2 hours. After completion of the dropwise addition, a solution composed of 0.4 part of a polymerization initiator and 10 parts of methyl ethyl ketone is added and stirred at 80° C. for 2 hours, furthermore, a solution composed of 0.4 part of a polymerization initiator and 10 parts of methyl ethyl ketone is added and stirred at 80° C. for 2 hours, then heated to 85° C. and stirred for 2 hours. Thus, a polymer P01 solution in which the polymer P01 is dissolved in methyl ethyl ketone is obtained. The weight average molecular weight (Mw) of the polymer P01 is 34,000 (calculated in terms of polystyrene by GPC), the acid value is 34 mg KOH/g, and the solid content concentration of the polymer P01 solution is 48% by weight.

[Synthesis of Polymers P01-1 to 01-2, P05 to 05-3, P06 to 06-6, P11, P50 to 52]

Each polymer solution is obtained in the same manner as in the synthesis of the polymer P01 except that the types and amounts of the monomers are changed according to Table 1.

Example 2: Preparation of Polymer Dispersion

[Preparation of Polymer Dispersion PD-1]

16.7 parts of the polymer P01 solution is put in a flask, 6 parts of methyl ethyl ketone and 2 parts of isopropyl alcohol are added thereto, and stirring and mixing are carried out. Next, a 10% by weight aqueous solution of sodium hydroxide is added in an amount corresponding 0.8 equivalents of the total carboxy groups included in the polymer P01 while stirring. Subsequently, 60 parts of water are slowly added thereto and mixed with stirring. After the mixed solution exhibits a nearly homogeneous state, a distillation tube and a decompression pump are attached to the flask, the mixed solution is heated to the temperature of 30° C. to 35° C. or less, the pressure is reduced while stirring to distill off the organic solvent and a part of water. The concentration operation is repeated while replacing the organic solvent with water and adjusting the addition amount of water such that the solid content concentration converted from the material does not exceed 17% by weight until the odor of the organic solvent disappears. The concentrated solution is filtered through a 230-mesh nylon mesh to obtain a polymer dispersion. With respect to the polymer dispersion, the solid content is measured by the method described in "(1) Yield" described below, and the yield is determined. On the basis of the measured solid content, water is added to the polymer dispersion to adjust the solid content concentration to be 15% by weight, thereby obtaining a polymer dispersion PD-1.

[Preparation of Polymer Dispersions PD-2 to 19]

Polymer dispersions PD-2 to 8 and 11 to 19 are obtained in the same manner as in the preparation of polymer dispersion PD-1 except that the type of polymer and degree of neutralization (addition amount (equivalent amount) of sodium hydroxide to all of the carboxyl groups included in the polymer) are changed according to Table 1. In Preparation Examples PD-9 and PD-10, aggregates are generated and a polymer dispersion is not able to be obtained.

[Evaluation]
(1) Yield

A part of the polymer dispersion is dried by heating at 120° C. for 2 hours under atmospheric pressure, the solid content (weight) is measured, the yield is determined according to the following formula, and is classified as follows.

Solid content of the polymer dispersion/(solid content of the polymer solution used for preparing the polymer dispersion+weight of sodium hydroxide used for neutralization in the process of preparing the polymer dispersion)×100     Formula G1: Yield of 90% or more.
G2: Yield of 70% or more and less than 90%.
G3: Yield of less than 70%.
G4: Aggregates are generated and a polymer dispersion is not obtained.

(2) Particle Size

Using a dynamic light scattering type particle size distribution measurement apparatus LB-500 (manufactured by HORIBA, LTD.), the volume-based median diameter (nm) of the particles dispersed in the polymer dispersion (solid content concentration: 15% by weight) is measured.

(3) Amount of Water-Soluble Component

Water is added to the polymer dispersion (solid content concentration: 15% by weight) to adjust the solid content concentration to be 10% by weight. 5 mL of a polymer dispersion having a solid content concentration of 10% by weight is put on a filter of a centrifugal ultrafiltration filter unit (manufactured by MILLIPORE, AMICON ULTRA-15, fraction molecular weight Mw 100,000) and is centrifuged for 40 minutes at a centrifugal acceleration of 4,000 G at 10° C. with a small high-speed cooled centrifuge (manufactured by TOMY SEIKO, SRX-201) to collect the filtrate (the medium of the polymer dispersion). The collected filtrate is heated at 120° C. under atmospheric pressure for 30 minutes and then kept at 120° C. under reduced pressure (degree of vacuum of 0.1 MPa or less) for 2 hours, and then the weight of the dry matter is measured. The ratio of the dry matter content of the filtrate with respect to the solid content of the polymer dispersion is calculated and rated as follows.

G1: The dry matter content (amount of water-soluble component) of the filtrate is less than 5% by weight.
G2: The dry matter content (amount of water-soluble component) of the filtrate is 5% by weight or more and less than 10% by weight.
G3: The dry matter content (amount of water-soluble component) of the filtrate is 10% by weight or more.

TABLE 1

| Polymer Dispersion | | PD-1 | PD-2 | PD-3 | PD-4 | PD-5 | PD-6 | PD-7 | PD-8 | PD-9 | PD-10 |
|---|---|---|---|---|---|---|---|---|---|---|---|
| Polymer | | P01 | P01-1 | P01-2 | P11 | P05 | P05-1 | P05-2 | P05-3 | P50 | P51 |
| Polymerization component (parts by weight) | PhOEMA | 40 | 40 | 40 | — | — | — | — | — | — | — |
| | BzA | — | — | — | 54 | — | — | — | — | — | — |
| | St | — | — | — | — | 30 | 30 | 30 | 30 | 70 | 60 |
| | MMA | 50 | 57 | 58 | 40 | — | — | — | — | — | — |
| | EMA | — | — | — | — | 54 | 50 | 45 | 40 | 14 | 23 |
| | BA | — | — | — | — | — | — | — | — | 8 | 9 |
| | CEA | 10 | 3 | 2 | 6 | 16 | 20 | 25 | 30 | — | — |
| | MAA | — | — | — | — | — | — | — | — | 8 | 8 |
| Phenyl group content of polymer (% by weight) | | 15 | 15 | 15 | 26 | 22 | 22 | 22 | 22 | 52 | 45 |
| Mw of polymer | | 34000 | 36000 | 32000 | 42000 | 28000 | 29000 | 26000 | 26000 | 47000 | 39000 |
| Acid value of polymer (mgKOH/g) | | 34 | 10 | 6.8 | 21 | 55 | 68 | 86 | 103 | 21 | 21 |
| Neutralization degree | | 0.8 | 0.9 | 0.9 | 0.8 | 0.6 | 0.6 | 0.6 | 0.6 | 0.8 | 0.8 |
| Dispersion pH | | 8.0 | 8.6 | 8.7 | 8.1 | 7.6 | 7.5 | 7.3 | 7.2 | 9.9 | 9.7 |
| Yield | | G1 | G1 | G3 | G1 | G1 | G1 | G1 | G2 | G4 | G4 |
| Particle size (nm) | | 25 | 53 | 82 | 27 | 28 | 30 | 22 | 30 | Not measured | Not measured |
| Aqueous component amount | | G1 | G1 | G1 | G1 | G1 | G1 | G2 | G3 | Not measured | Not measured |
| Notes | | Example | Example | Comparative example | Example | Example | Example | Example | Comparative example | Comparative example | Comparative example |

TABLE 1-continued

| Polymer Dispersion | | PD-11 | PD-12 | PD-13 | PD-14 | PD-15 | PD-16 | PD-17 | PD-18 | PD-19 |
|---|---|---|---|---|---|---|---|---|---|---|
| Polymer | | P06-1 | P06-2 | P06-3 | P06 | P06 | P06-4 | P06-5 | P06-6 | P52 |
| Polymerization component (parts by weight) | PhOEMA | — | — | — | — | — | — | — | — | — |
| | BzA | — | — | — | — | — | — | — | — | — |
| | St | 70 | 60 | 50 | 30 | 30 | 7 | 5 | 2 | 2 |
| | MMA | — | — | — | — | — | — | — | — | — |
| | EMA | 14 | 23 | 31 | 49 | 49 | 57 | 59 | 60 | 60 |
| | BA | 10 | 11 | 13 | 15 | 15 | 30 | 30 | 32 | 30 |
| | CEA | 6 | 6 | 6 | 6 | 6 | 6 | 6 | 6 | — |
| | MAA | — | — | — | — | — | — | — | — | 8 |
| Phenyl group content of polymer (% by weight) | | 52 | 45 | 37 | 22 | 22 | 5.2 | 3.7 | 1.5 | 1.5 |
| Mw of polymer | | 48000 | 41000 | 40000 | 43000 | 43000 | 39000 | 42000 | 41000 | 36000 |
| Acid value of polymer (mgKOH/g) | | 21 | 21 | 21 | 21 | 21 | 21 | 21 | 21 | 21 |
| Neutralization degree | | 0.8 | 0.8 | 0.8 | 0.8 | 1.0 | 0.8 | 0.8 | 0.8 | 0.8 |
| Dispersion pH | | 8.2 | 8.1 | 8.0 | 8.0 | 9.6 | 8.0 | 8.0 | 8.0 | 9.7 |
| Yield | | G1 | G1 | G1 | G1 | G1 | G1 | G1 | G1 | G1 |
| Particle size (nm) | | 25 | 23 | 16 | 12 | 12 | 12 | 14 | 16 | 52 |
| Aqueous component amount | | G1 | G1 | G1 | G1 | G2 | G1 | G1 | G1 | G1 |
| Notes | | Example | Example | Example | Example | Example | Example | Example | Example | Comparative example |

The meanings of the abbreviations in Tables 1 and 2 are as follows.
PhOEMA: 2-phenoxyethyl methacrylate, BzA: benzyl acrylate, St: styrene, MMA: methyl methacrylate, EMA: ethyl methacrylate, BA: n-butyl acrylate, CEA: Sipomer β-CEA (2-carboxyethyl acrylate), MAA: Methacrylic acid In Preparation Examples PD-9 and PD-10, aggregates are generated and a polymer dispersion is not able to be obtained. Comparing PD-9 and PD-10 with PD-11 and PD-12 having similar polymer compositions, it is understood that aggregates are generated in a case where 2-carboxyethyl (meth)acrylate is not included as a constituent unit.

Preparation Example PD-19 does not include 2-carboxyethyl (meth)acrylate as a constituent unit but is able to prepare a polymer dispersion. However, when comparing PD-19 and PD-18 having similar polymer compositions, PD-19 not including 2-carboxyethyl (meth)acrylate as a constituent unit has a large particle size. In addition, when PD-19 and PD-18 are neutralized to the same degree of neutralization, the pH of PD-19 is 1.7 higher than the pH of PD-18.

Example 3: Preparation of Infrared-Absorbing Particle Dispersion

[Preparation of Infrared-Absorbing Particle Dispersion ID-1]

20 parts of a perimidine squarylium compound represented by the following formula as an infrared absorbing agent are put in a flask. 3,600 parts of tetrahydrofuran are added thereto, and a stirring bar is added to carry out stirring. Next, 790 parts of the polymer P01 solution are added, and 800 parts of methyl ethyl ketone and 80 parts of isopropyl alcohol are further added and mixed with stirring. Next, a 10% by weight aqueous solution of sodium hydroxide is added in an amount corresponding to 0.8 equivalents of the total carboxy groups included in the polymer P01 while stirring. Next, while stirring is maintained, 10,000 parts of water are slowly added and mixed therein. After the mixed solution exhibits a nearly homogeneous state, a distillation tube and a decompression pump are attached to the flask, the mixed solution is heated to from 30° C. to 35° C., the pressure is reduced while stirring, and the organic solvent and a part of water are distilled off. The concentration operation is repeated while replacing the organic solvent with water and adjusting the addition amount of water such that the solid content concentration converted from the material does not exceed 7% by weight until the odor of the organic solvent odor disappears. The concentrated solution is filtered through a 230-mesh nylon mesh to obtain an infrared absorbing particle dispersion. With respect to the infrared absorbing particle dispersion, the solid content is measured according to the method described in "(1) Yield" to be described below, and the yield is determined. On the basis of the measured solid content, water is added to this infrared absorbing particle dispersion to adjust the solid content concentration to 5% by weight, which is designated as the infrared absorbing particle dispersion ID-1. When converted from the amount of the infrared absorbing agent and the amount of the polymer used for preparing the infrared absorbing particle dispersion, the concentration of the infrared absorbing agent in the infrared absorbing particle dispersion ID-1 is 0.25% by weight.

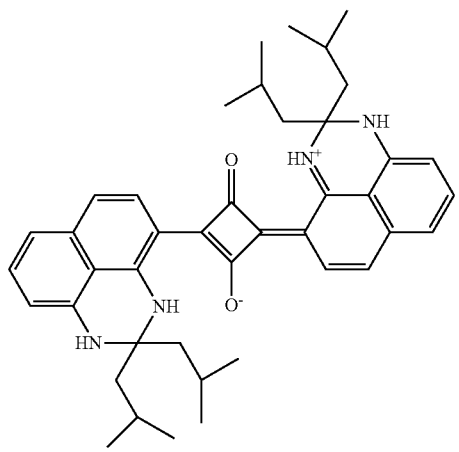

perimidine-based squarylium compound

[Preparation of Infrared Absorbing Particle Dispersions ID-2 to 15]

Infrared absorbing particle dispersions ID-2 to 15 are obtained in the same manner as in the preparation of the infrared absorbing particle dispersion ID-1 except that the type of the polymer and the degree of neutralization (addition amount (equivalent amount) of sodium hydroxide to total carboxyl groups included in the polymer) are changed in accordance with Table 2.

G1: Yield of 90% or more.
G2: Yield of 80% or more and less than 90%.
G3: Yield of 70% or more and less than 80%.
G4: Yield less than 70%.
(2) Particle Size
Using a dynamic light scattering type particle size distribution measurement apparatus LB-500 (HORIBA, LTD.), the volume-based median diameter (nm) of particles dispersed in an infrared absorbing particle dispersion (solid content concentration: 5% by weight) is measured.

TABLE 2

| Infrared Absorbing Particle Dispersion | | ID-1 | ID-2 | ID-3 | ID-4 | ID-5 | ID-6 | ID-7 | ID-8 |
|---|---|---|---|---|---|---|---|---|---|
| Polymer | | P01 | P01-1 | P01-2 | P11 | P05 | P05-2 | P05-3 | P06-1 |
| Polymerization component (parts by weight) | PhOEMA | 40 | 40 | 40 | — | — | — | — | — |
| | BzA | — | — | — | 54 | — | — | — | — |
| | St | — | — | — | — | 30 | 30 | 30 | 70 |
| | MMA | 50 | 57 | 58 | 40 | — | — | — | — |
| | EMA | — | — | — | — | 54 | 45 | 40 | 14 |
| | BA | — | — | — | — | — | — | — | 10 |
| | CEA | 10 | 3 | 2 | 6 | 16 | 25 | 30 | 6 |
| | MAA | | | | | | | | |
| Phenyl group content of polymer (% by weight) | | 15 | 15 | 15 | 26 | 22 | 22 | 22 | 52 |
| Mw of polymer | | 34000 | 36000 | 32000 | 42000 | 28000 | 26000 | 26000 | 48000 |
| Acid value of polymer (mgKOH/g) | | 34 | 10 | 6.8 | 21 | 55 | 86 | 103 | 21 |
| Neutralization degree | | 0.8 | 0.9 | 0.9 | 0.8 | 0.6 | 0.6 | 0.6 | 0.8 |
| Dispersion pH | | 8.0 | 8.6 | 8.7 | 8.1 | 7.6 | 7.3 | 7.2 | 8.2 |
| Yield | | G1 | G1 | G4 | G1 | G1 | G2 | G4 | G3 |
| Particle size (nm) | | 27 | 50 | 75 | 30 | 30 | 27 | 28 | 27 |
| Notes | | Example | Example | Comparative example | Example | Example | Example | Comparative example | Example |

| Infrared Absorbing Particle Dispersion | | ID-9 | ID-10 | ID-11 | ID-12 | ID-13 | ID-14 | ID-15 |
|---|---|---|---|---|---|---|---|---|
| Polymer | | P06-2 | P06-3 | P06 | P06-4 | P06-5 | P06-6 | P52 |
| Polymerization component (parts by weight) | PhOEMA | | | | | | | |
| | BzA | | | | | | | |
| | St | 60 | 50 | 30 | 7 | 5 | 2 | 2 |
| | MMA | | | | | | | |
| | EMA | 23 | 31 | 49 | 57 | 59 | 60 | 60 |
| | BA | 11 | 13 | 15 | 30 | 30 | 32 | 30 |
| | CEA | 6 | 6 | 6 | 6 | 6 | 6 | — |
| | MAA | | | | | | | 8 |
| Phenyl group content of polymer (% by weight) | | 45 | 37 | 22 | 5.2 | 3.7 | 1.5 | 1.5 |
| Mw of polymer | | 41000 | 40000 | 43000 | 39000 | 42000 | 41000 | 36000 |
| Acid value of polymer (mgKOH/g) | | 21 | 21 | 21 | 21 | 21 | 21 | 21 |
| Neutralization degree | | 0.8 | 0.8 | 0.8 | 0.8 | 0.8 | 0.8 | 0.8 |
| Dispersion pH | | 8.1 | 8.0 | 8.0 | 8.0 | 8.0 | 8.0 | 9.7 |
| Yield | | G1 | G1 | G1 | G1 | G2 | G3 | G4 |
| Particle size (nm) | | 23 | 18 | 14 | 12 | 13 | 15 | 50 |
| Notes | | Example | Example | Example | Example | Example | Example | Comparative example |

[Evaluation]
(1) Yield
Apart of the infrared absorbing particle dispersion is dried by heating at 120° C. for 2 hours under atmospheric pressure, the solid content (weight) is measured, the yield is determined according to the following formula, and is classified as follows.

Solid content of the infrared absorbing particle dispersion/(amount of infrared absorbing agent used for preparing infrared absorbing particle dispersion+amount of solid content of polymer solution used for preparing infrared absorbing particle dispersion+weight of sodium hydroxide used for neutralization in the process of preparing the infrared absorbing particle dispersion)×100     Formula Example 4: Preparation of Light-Fixing Ink (Infrared Absorbing Ink)

[Preparation of Cyan Pigment Dispersion CD 1]
A mixed solution composed of 6 parts of styrene, 11 parts of stearyl methacrylate, 4 parts of styrene macromer AS-6 (TOAGOSEI CO., LTD.), 5 parts of Blemmer PP-500 (NOF Corp.), 5 parts of methacrylic acid, 0.05 parts of 2-mercaptoethanol, and 24 parts of methyl ethyl ketone is prepared in a reaction container. Separately, a mixed solution composed of 14 parts of styrene, 24 parts of stearyl methacrylate, 9 parts of styrene macromer AS-6 (TOAGOSEI CO., LTD.), 9 parts of Blemmer PP-500 (NOF Corp.), 10 parts of methacrylic acid, 0.13 parts of 2-mercaptoethanol, 56 parts of methyl ethyl ketone, and 1.2 parts of 2,2'-azobis (2,4-dimethylvaleronitrile) is prepared and put in a dropping funnel.

Under a nitrogen atmosphere, the mixed solution in the reaction container is heated to 75° C. while stirring, and the mixed solution in the dropping funnel is added dropwise thereto over 1 hour. After 2 hours from the completion of the dropwise addition, a solution in which 1.2 parts of 2,2'-azobis (2,4-dimethylvaleronitrile) are dissolved in 12 parts of methyl ethyl ketone is added dropwise over 3 hours, followed by performing the reaction at 75° C. for 2 hours and further aging at 80° C. for 2 hours, thereby obtaining a polymer solution.

5 parts (in terms of solid content) of the obtained polymer solution, 10 parts of Pigment Blue 15:3 (DAINICHISEIKA COLOR & CHEMICALS MFG. CO., LTD.), 40 parts of methyl ethyl ketone, 8 parts of 1 mol/L sodium hydroxide aqueous solution, and 82 parts of ion-replaced water are introduced into a bead mill disperser together with 300 parts of 0.1 mm zirconia beads, and dispersed for 6 hours. The obtained dispersion is concentrated under reduced pressure using an evaporator to remove methyl ethyl ketone and carry out concentration so as to provide a pigment concentration of 10% by weight. In this manner, a cyan pigment dispersion CD1 is obtained in which a cyan pigment having a surface coated with the polymer dispersing agent is dispersed. The volume average particle size of the cyan pigment dispersion CD1 is 77 nm.

[Preparation of Cyan Ink C-1]

After mixing the following materials, coarse particles are removed with a 5 μm filter to obtain a cyan ink C-1. The pH of the cyan ink C-1 is 8.6.

Cyan Pigment Dispersion CD1 6% by weight (in terms of solid content)
Infrared Absorbing Particle Dispersion ID-1 1% by weight (in terms of solid content)
Diethylene glycol 5% by weight
Propanediol 25% by weight
OLFIN E1010 (NISSHIN CHEMICAL INDUSTRY CO., LTD.) 1.2% by weight
Ion exchanged water Residual amount at which the total amount becomes 100% by weight

[Preparation of Cyan Inks C-2 to 12]

Cyan inks C-2 to 12 are obtained in the same manner as in the preparation of cyan ink C-1 except that the infrared absorbing particle dispersion ID-1 is changed to any one of the infrared absorbing particle dispersions ID-2, 4 to 6, 8 to 14.

[Printing Test]

Cyan Inks C-1 to 12 are refilled into cartridges of an ink jet printer PX-1004 manufactured by EPSON CORP., and when printing is performed on TOKUBISHI ART DOUBLE SIDED N (MITSUBISHI PAPER MILLS LTD.) with an ink jet printer PX-1004, good printing is achieved without ejection failure with all of the inks C-1 to 12. When the image is irradiated with infrared rays under the conditions of a center wavelength of 810 nm, an irradiation intensity of 3 J/cm$^2$, and an irradiation time of 200 ms, images with no blur are obtained in all of the cyan inks C-1 to 12.

Example 5: Preparation of Magenta Colored Particle Dispersion

[Preparation of Colored Particle Dispersion MD-1]

A colored particle dispersion MD-1 is obtained in the same manner as in the preparation of the infrared absorbing particle dispersion ID-1, except that a magenta dye represented by the following formula is used in place of the perimidine squarylium compound. The colored particle dispersion MD-1 is a magenta-colored dispersion without turbidity, and the volume average particle size is 32 nm.

magenta dye

[Preparation of Colored Particle Dispersions MD-2 to 12]

Colored particle dispersions MD-2 to 12 are obtained in the same manner as in the preparation of the infrared absorbing particle dispersions ID-2, 4 to 6, 8 to 14, except that magenta dyes represented by the above formula are used instead of the perimidine squarylium compound. The colored particle dispersions MD-2 to 12 are magenta dispersions without turbidity.

Example 6: Preparation of Magenta Aqueous Ink

[Preparation of Magenta Ink M-1]

Magenta Ink M-1 is obtained by mixing the following materials and then removing coarse particles with a 5 μm filter. The pH of the magenta ink M-1 is 8.2.

Colored particle dispersion MD-1 2% by weight (in terms of solid content)
Diethylene glycol (WAKO PURE CHEMICAL INDUSTRIES, LTD.) 5% by weight
Propanediol (WAKO PURE CHEMICAL INDUSTRIES LTD.) 25% by weight
OLFIN E1010 (NISSHIN CHEMICAL INDUSTRY CO., LTD.) 1.2% by weight
Ion exchanged water Residual amount at which the total amount becomes 100% by weight

[Preparation of Magenta Inks M-2 to 12]

Magenta inks M-2 to 12 are obtained in the same manner as the preparation of the magenta ink M-1 except that the colored particle dispersion MD-1 is changed to any one of the colored particle dispersions MD-2 to 12.

[Printing Test]

Magenta inks M-1 to 12 are refilled into cartridges of an ink jet printer PX-1004 manufactured by EPSON CORP., and when printing is performed on TOKUBISHI ART DOUBLE SIDED N (MITSUBISHI PAPER MILLS LTD.) with an ink jet printer PX-1004, good printing is achieved without ejection failure with all of the magenta inks M-1 to M-12.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polymer comprising (a) 2-carboxyethyl (meth)acrylate (b) alkyl (meth)acrylate, and (c) a phenyl group containing monomer as constituent units and having an acid value of 7 mg KOH/g to 100 mg KOH/g,
wherein the phenyl group containing monomer comprises one selected from the group consisting of naphthyl (meth)acrylate, 2-phenoxyethyl (meth)acrylate, and 2-hydroxy-3-phenoxypropyl (meth)acrylate.

2. The polymer according to claim 1,
wherein an alkyl group of the alkyl (meth)acrylate has 1 to 8 carbon atoms.

3. The polymer according to claim 1,
wherein the phenyl group containing monomer comprises 2-phenoxyethyl methacrylate.

4. The polymer according to claim 1,
which comprises the phenyl group containing monomer in an amount of 3% by weight to 50% by weight with respect to a total weight of the polymer.

5. The polymer according to claim 1,
wherein a ratio of 2-carboxyethyl (meth)acrylate with respect to all the constituent units constituting the polymer is from 2% by weight to 26% by weight.

6. The polymer according to claim 1,
wherein a ratio of alkyl (meth)acrylate with respect to all the constituent units constituting the polymer is from 10 by weight to 90% by weight.

7. The polymer according to claim 1,
which has a weight average molecular weight of 3,000 to 200,000.

8. The polymer according to claim 1,
which has a glass transition temperature of 40° C. to 150° C.

9. A polymer dispersion comprising:
an aqueous medium; and
the polymer according to claim 1, which is dispersed in the aqueous medium.

10. The polymer dispersion according to claim 9,
which has a pH of 6.0 to 9.5.

11. The polymer dispersion according to claim 9,
which has a surface tension of 20 mN/m to 40 mN/m.

12. The polymer dispersion according to claim 9,
which has a viscosity of 1 mPa·s to 30 mPa·s.

13. An aqueous ink comprising:
an aqueous medium; and
the polymer according to claim 1, which is dispersed in the aqueous medium.

14. The aqueous ink according to claim 13,
which has a pH of 6.0 to 9.5.

15. The aqueous ink according to claim 13,
which has a surface tension of 20 mN/m to 40 mN/m.

16. The aqueous ink according to claim 13,
which has a viscosity of 1 mPa·s to 30 mPa·s.

17. The polymer according to claim 1,
wherein the phenyl group containing monomer comprises 2-phenoxyethyl acrylate.

18. The polymer according to claim 1,
wherein the phenyl group containing monomer comprises 2-phenoxyethyl (meth)acrylate and styrene.

19. The polymer according to claim 1,
wherein the phenyl group containing monomer comprises 2-phenoxyethyl (meth)acrylate and benzyl (meth)acrylate.

* * * * *